United States Patent [19]

Mölls et al.

[11] 4,118,384

[45] Oct. 3, 1978

[54] PROCESS FOR PREPARATION OF AZO DYESTUFFS BY COUPLING IN PRESENCE OF AROMATIC SULPHONIC ACID-FORMALDEHYDE REACTION PRODUCT

[75] Inventors: Hans-Heinz Mölls; Willy Schiwy, both of Leverkusen; Reinhold Hörnle, Cologne; Reinhard Nebeling, Leverkusen, all of Germany

[73] Assignee: Bayer Aktiengesellschaft, Leverkusen, Germany

[21] Appl. No.: 769,727

[22] Filed: Feb. 17, 1977

[30] Foreign Application Priority Data

Feb. 21, 1976 [DE] Fed. Rep. of Germany ....... 2607122

[51] Int. Cl.$^2$ ...................... C09B 29/08; C09B 29/26; C09B 29/36; C09B 29/38
[52] U.S. Cl. .................................... 260/163; 260/141; 260/144; 260/165; 260/193; 260/205; 260/206; 260/207; 260/207.1
[58] Field of Search ............... 260/163, 165, 144, 193, 260/196, 205, 206, 207, 207.1, 141 F

[56] References Cited

U.S. PATENT DOCUMENTS 2,498,722  2/1950  Straley ............................ 260/141 X

OTHER PUBLICATIONS

Auderton et al. (I), Chemical Abstracts, vol. 79, #147418g (1973).
Badische Anilin, Chemical Abstracts, vol. 65, 7349f (1966).
Anderton et al. (II), Chemical Abstracts, vol. 81, #79384g (1974).

*Primary Examiner*—Floyd D. Higel
*Attorney, Agent, or Firm*—Plumley and Tyner

[57] ABSTRACT

Dyestuff dispersions and dyestuff solutions free from salt or at least having a low salt content are obtained in that the diazotization is carried out with addition of free dispersing agent acid to which, after the synthesis, either no basic agents are added or basic agents are added only up to a pH value of 3. The disclosed process gives dyestuff compositions of low salt content and results in readily dispersible dyestuffs when water insoluble dyestuffs are prepared and stable solutions when water soluble dyestuffs are prepared. The process is widely applicable and chemical constitution of the dyestuffs is conventional.

5 Claims, No Drawings

PROCESS FOR PREPARATION OF AZO DYESTUFFS BY COUPLING IN PRESENCE OF AROMATIC SULPHONIC ACID-FORMALDEHYDE REACTION PRODUCT

The subject of the invention is a simplified process for the preparation of azo dyestuffs by diazotising and coupling, especially for the preparation of stable azo dyestuff solutions or azo dyestuff dispersions which have a low salt content or are free from salt.

Axo dyestuffs have hitherto in the main been prepared by diazotising the diazo component in the presence of aqueous or anhydrous mineral acids and coupling the product to the coupling component. The second process step was carried out under conditions which could vary depending on the nature of the dyestuff to be prepared, or on the nature of the coupling component. The process was in each case so designed that the finished dyestuff could readily be isolated by filtration. This required a subsequent finishing treatment, that is to say process measures which permitted converting the dyestuff press cake into a stable form suitable for dyeing. These process measures were coupled with a considerable expenditure of mechanical energy and, due to the plurality of synthesis equipment and finishing equipment, entailed increased costs.

Because of this expenditure on apparatus and energy there existed a need so to modify the synthesis of azo dyestuffs that after the coupling reaction either a dyestuff solution which is as stable as possible, or a highly disperse dyestuff suspension, is obtained directly, or, at the least, the subsequent finishing steps can be reduced substantially.

German Offenlegungsschrift (German Published Specification) 2,313,003 therefore proposes a process in which the preparation of aqueous dispersions of water-insoluble azo dyestuffs is carried out in the presence of anionic dispersing agents, that is to say, for example, of sodium salts of condensation products of naphthalene-sulphonic acids and formaldehyde. However, the aqueous dispersions thus obtained suffer from the disadvantage of a high salt ballast which is introduced into the dispersion by the mineral acids and alkalis required for the diazotisation and coupling.

German Auslegeschrift (German Published Specification) 1,469,606 has already disclosed that the technological properties of aqueous dispersions of water-insoluble dyestuffs are improved if the salt content is reduced. In this published specification, dialysis, ion exchange, electrolysis and precipitation are proposed as processes for lowering the salt content. All these processes entail considerable costs because of additional process steps or apparatus.

A combination of the processes of the two above-mentioned literature references is proposed in German Offenlegungsschrift (German Published Specification) No. 2,358,080, in which a process for the preparation of aqueous dispersions of azo dyestuffs is described, in which the azo dyestuffs are prepared by diazotisation and coupling in the presence of an anionic dispersing agent, after which the azo dyestuff suspension thus obtained is subjected to a membrane separation process to reduce the salt content. This is followed by a mechanical grinding treatment and a drying treatment. In this context, membrane separation processes are in particular to be understood as ultrafiltration and electrodialysis.

The same process is furthermore described for a special category of dyestuffs in German Offenlegungsschrift (German Published Specification) No. 2,411,803.

A process has now been found which makes it possible, surprisingly, to prepare azo dyestuffs by diazotisation and coupling in such a way that, in the case of dyestuffs which are sparingly soluble in water, readily dispersible azo dyestuffs which are free from salt or at least have a low salt content, or stable dyestuff dispersions which are free from salt or at least have a low salt content, are obtained, whilst in the case of water-soluble dyestuffs, dyestuffs which are free from salt or at least have a low salt content, or stable solutions, which are free from salt or at least have a low salt content, of the dyestuffs are obtained, without having to employ the finishing processes and salt removal processes which are known to be expensive.

The process according to the invention is characterised in that the diazotisation is carried out with addition of free dispersing agent acid to which, after the synthesis, either no basic agents are added or basic agents are added only up to a pH value of 3. The subsequent coupling is carried out under conditions which can vary in accordance with the nature of the dyestuff to be prepared or of the coupling component. If necessary, further dispersing agents can also be added to the coupling component.

Examples of basic agents which can be used are alkali metal compounds and alkaline earth metal compounds, as well as ammonia and organic amines, such as monoalkylamines, dialkylamines and trialkylamines with $C_1$–$C_4$-alkyl groups, piperidine, morpholine, quinoline, pyridine and diazobicyclooctane.

Preferably, salt-free dispersing agent acid is used, preferentially as the sole acid.

The process consists of the following steps:

First, a diazotisable amine is stirred with the amount of the dispersing agent acid required for the diazotisation, and the amine is then diazotised.

The diazotisation can be varied in the sense that the diazotisable amine together with the amount of diazotising reagent required for the diazotisation are first introduced and the appropriate amount of the dispersing agent acid is then added gradually.

The resulting diazonium compound is then coupled with an aqueous solution or suspension of a coupling component, if appropriate with addition of further dispersing agents, the coupling conditions depending on the reactants.

The concentrations of diazonium compound and of coupling component are preferably so chosen as to produce a concentrated aqueous solution or suspension of a dyestuff, which preferably contains more than 8% of azo dyestuff.

Preferably, the process according to the invention is carried out for those dyestuffs which are sparingly soluble in water. These dyestuffs include, above all, disperse dyestuffs and pigments, but it is also possible to use reactants which lead to water-soluble azo dyestuffs.

Condensation products of formaldehyde and aromatic sulphonic acids can be used as dispersing agent acids. Examples of such dispersing agent acids are the condensation products of naphthalenesulphonic acid and formaldehyde, of ditolyl-ether-sulphonic acid and formaldehyde, of diphenyl-ether-sulphonic acid and formaldehyde, of diphenylsulphonic acid and formaldehyde or of terphenylsulphonic acid and formaldehyde.

Mixed condensates of the abovementioned acids can also be used.

The condensation products of aromatic sulphonic acids and formaldehyde are prepared by reaction of 0.5–1.5 mols of the aromatic compound, for example ditolyl ether, with 0.5–3 mols of sulphuric acid, and condensation with 0.4–2.0 mols of formaldehyde, in accordance with customary processes.

After the neutralisation of the coupling suspension or solution, a purification step by a membrane separation process can follow, if desired, in order to remove the by-products which may have been formed in the reaction. The dyestuff solution or suspension is then adjusted to the desired tinctorial strength with the requisite amount of standardising agents, and is dried.

The drying of the dispersion or solution of the azo dyestuff can be carried out in any customary form of a convection drier or contact drier, the type of drier, the temperature and other measures being selected in accordance with generally known principles in order to suit them to the dispersion or solution to be dried. Preferably, spray drying is carried out.

In an advantageous modification, the process according to the invention can also be carried out in a stirred ball mill. The abovementioned reaction steps can be carried out continuously or discontinuously. According to the process claimed, diazotisation and coupling can also be carried out synchronously, with simultaneous comminution.

The following may be mentioned as typical examples of amines which can be diazotised in accordance with the process of the invention: 4-nitroaniline; 3-nitroaniline; 2-nitroaniline; 2-chloro-4-nitroaniline; 2,6-dichloro-4-nitroaniline; 2,6-dibromo-4-nitroaniline; 4-aminoacetanilide; 2-nitro-4-methylaniline; 4-(O-tolylazo)-2-methylaniline; 4-aminoazobenzene; 4-nitrophenylazo-1-naphthylamine; 2,4-dinitroaniline; 2,5-dimethoxyaniline; 2-cyano-4-nitroaniline; 2,4-dinitro-6-chloroaniline; 2,5-diethoxyaniline; 4-cyanoaniline; 2-chloroaniline; 3-chloroaniline; 4-chloroaniline; 2-amino-4-acetylaminotoluene; benzidine; 3,3′-dichlorobenzidine; 2-nitrobenzidine; aniline; 4,4′-methylene-di-(m-toluidine); o-anisidine; o-phenetidine; 2,4,5-trichloroaniline; 4-nitro-2-aminoanisole; 5-nitro-2-aminoanisole; 4-chloro-2-aminoanisole; p-phentidine; p-anisidine; 1,3-di-(p-aminophenoxy)-propane; 4-amino-4-methoxydiphenylamine; 2-nitro-4-aminoanisole; 3-nitro-4-aminoanisole; p,p′-thiodianiline; p,p′-hydroxydianiline; 4-aminodiphenyl ether; 5-methyl-o-anisidine; 2-ethoxy-1-naphthylamine; α-naphthylamine; dianisidine; 4-carbomethoxyamino-2,5-diethoxyaniline; 4-benzylamino-2,5-diethoxyaniline; di-(4′-aminobenzoyl)-m-phenylenediamine; 3-amino-4-methylbenzonitrile; 4-(picolinylamino)-2,5-diethoxyaniline; 1-(m-aminophenyl)-3-methyl-5-pyrazolone; 2-cyano-4-nitroaniline; 4,4′-diphenylsulphone; 4-methylsulphonylaniline; 1-amino-2,3,4,5-tetracyanocyclopentadiene; 2-(o-aminophenyl)-2,1,3-benzotriazole; 2-(o-aminophenyl)-2,1,3-α,β-naphthotriazole; 4-aminobenzophenone; 4-aminoacetophenone; 4-(p-nitrophenylazo)-2,5-dimethoxyaniline; 4-(2,6-dichloro-4-nitrophenylazo)-2,5-dimethoxyaniline; 2,4-dicyanoaniline; 3-chloro-4-cyanoaniline; o-aminobenzotrifluoride; 5-chloro-2-aminobenzotrifluoride; dehydrothio-p-toluidine; 4′-amino-2-chlorobenzophenone; 4-amino-2,4-dichlorobenzophenone; 2-amino-4′-bromobenzophenone; 3′-amino-3-bromo-4-methylbenzophenone; 2′-amino-2,5-dimethylbenzophenone; 4-amino-4′-ethylbenzophenone; 2-amino-4′-methoxybenzophenone; 2′-amino-4-methoxy-2,5-dimethylbenzophenone; 3′-amino-3,5-dimethoxybenzophenone; 4′-amino-5-chloro-2-methoxybenzophenone; 4-amino-4′-methoxybenzophenone; 3-amino-4-methoxybenzophenone; 2-amino-2′-nitrobenzophenone; 2-amino-3′-nitrobenzophenone; α-amino-anthraquinone; β-aminoanthraquinone; 4-amino-4′-nitrobenzophenone; 4′-amino-2,4-dinitrobenzophenone; 4′-amino-2,4-dinitrobenzophenone; 4′-amino-4-methyl-3-nitrobenzophenone; 4-amino-4′-butylbenzophenone; 4-amino-4′-propoxybenzophenone; 2-amino-4′-fluorobenzophenone; 4-amino-2-propylbenzophenone; 2-amino-4,5-dipropoxybenzophenone; 2-amino-5-bromobenzophenone; 4-amino-3-chlorobenzophenone; 2-amino-4,5-dichlorobenzophenone; 4-amino-3,5-dibromobenzophenone; 4-amino-2-methylbenzophenone; 2-amino-5-methylbenzophenone; 2-amino-4,5-dimethylbenzophenone; 3-amino-2,4-dimethylbenzophenone; 2-amino-4,5-dimethoxybenzophenone; 2-amino-4-methoxybenzophenone; 3-amino-5-nitrobenzophenone; 3-amino-4-methyl-5-nitrobenzophenone; 2-amino-6-methyl-3-nitrobenzophenone; 2-amino-3,5-dinitrobenzophenone; 2-amino-4-methyl-3,5-dinitrobenzophenone; 2-amino-5-fluorobenzophenone; 4-chloro-2-(p-chlorophenylsulphonyl)-aniline; p-(p-bromophenylsulphonyl)-aniline; 2,5-dichloroaniline; 4-chloro-2-nitroaniline; o-toluidine; p-toluidine; 5-chloro-2-aminotoluene; 6-chloro-2-aminotoluene; 4-chloro-2-aminotoluene; 4-nitro-2-aminotoluene; 5-nitro-2-aminotoluene; m-aminobenzyl alcohol; 2,3-xylidene; m-xylidene; 2,4-xylidene; p-xylidene; 2,5-xylidine; p-butylaniline; p-dodecylaniline; n-formyl-m-phenylenediamine; n-oxalyl-m-phenylenediamine; p-aminodiphenylamine; p-aminoacetanilide; oxalyl-p-phenylenediamine; 2-chloro-4-phenylsulphonyl-aniline; 2-chloro-6-(phenylsulphonyl)-aniline; 3-chloro-2-(phenylsulphonyl)-aniline; 3-chloro-4-(phenylsulphonyl)-aniline; 5-chloro-2-(phenylsulphonyl)-aniline; 4-chloro-3-(phenylsulphonyl)-aniline; 4-chloro-2-(phenylsulphonyl)-aniline; 2-bromo-4-(phenylsulphonyl)-aniline; p-(2,4-dichlorophenylsulphonyl)-aniline; p-(2,5-dibromophenylsulphonyl)-aniline; p-(3,4-dichlorophenylsulphonyl)-aniline; 5-chloro-2-(p-tolylsulphonyl)-aniline; p-(p-tolylsulphonyl)-aniline; p-(p-propylphenylsulphonyl)-aniline; p-(p-fluorophenylsulphonyl)-aniline; p-(3-chloro-4-methoxyphenylsulphonyl)-aniline; p-(2,4-dimethoxyphenylsulphonyl)-aniline; p-(3,5-dimethoxyphenylsulphonyl)-aniline; p-(p-methoxyphenylsulphonyl)-aniline; p-(p-ethoxyphenylsulphonyl)-aniline; p-(2-methoxy-4-nitrophenylsulphonyl)-aniline; o-(p-methoxyphenylsulphonyl)-aniline; p-(o-methoxyphenylsulphonyl)-aniline; p-(p-nitrophenylsulphonyl)-aniline; 2-nitro-3-(phenylsulphonyl)-aniline; 2-nitro-5-(phenylsulphonyl)-aniline; 2,4-dinitro-5-(phenylsulphonyl)-aniline; 2-nitro-4-(p-nitrophenylsulphonyl)-aniline; 2-nitro-4-(m-nitrophenylsulphonyl)-aniline; o-(o-nitrophenylsulphonyl)-aniline; 2-nitro-4-(phenylsulphonyl)-aniline; 2-nitro-4-(p-tolylsulphonyl)-aniline; 2,6-dinitro-4-(p-tolylsulphonyl)-aniline; 4-(p-butoxyphenylsulphonyl)-3-ethylaniline; p-(2,5-xylylsulphonyl)-aniline; p-(2,4-xylylsulphonyl)-aniline; p-(2,4-dinitrophenylsulphonyl)-aniline; 2,4-dichloro-5-(phenylsulphonyl)-aniline; 2,3-diethyl-4-(phenylsulphonyl)-aniline; 2,5-dimethoxy-4-(phenylsulphonyl)-aniline; 2-aminobenzthiazole; 2-amino-4-chlorobenzthiazole; 2-amino-4-bromobenzthiazole; 2-amino-4-nitrobenzthiazole; 2-amino-4-cyanobenzthiazole; 2-amino-6-bromobenzthiazole; 2-amino-6-cyanobenzthiazole; 2-amino-6-nitrobenzthiazole; 2-amino-6-(trifluoromethyl)-benzthiazole; 6-acetyl-2-aminobenzthiazole; 2-amino-6-(trifluoroacetyl)-benzthiazole; 2-amino-6-valerybenzthiazole; 2-amino-6-(beta-hydroypropionyl)-benzthiazole; 2-amino-6-(cyclohexylcarbonyl)-benzthiazole; 2-amino-6-p-toluoylbenzthiazole; 2-amino-6-(o-chlorobenzoyl)-benzthiazole; 2-amino-6-(p-bromobenzoyl)-benzthiazole; 2-amino-6-(m-nitrobenzoyl)-benzthiazole; 2-amino-6-(methylsulphonyl)-benzthiazole; 2-amino-6-(2-hydroxyethylsulphonyl)-benzthiazole; 2-amino-6 -(propylsulphonyl)-benzthiazole; 2-amino-6-(cyclohexylsulphonyl)-benzthiazole; 2-amino-6-(phenylsulphonyl)-benzthiazole; 2-amino-6-(o-tolylsulphonyl)-benzthiazole; 2-amino-6-(m-chlorophenylsulphonyl)-benzthiazole; 2-amino-6-(p-bromophenylsulphonyl)-benzthiazole; 2-amino-6-(m-nitrophenylsulphonyl)-benzthiazole; 2-amino-6-(ethoxycarbonyl)-benzthiazole; 2-amino-6-(butoxycarbonyl)-benzthiazole; 2-amino-6-(trifluoromethylsulphonyl)-benzthiazole; 2-amino-4-bromo-6-nitrobenzthiazole; 2-amino-4,6-dinitrobenzthiazole; 2-amino-4,6-dicyanobenzthiazole; 2-amino-6-bromo-4-methylbenzthiazole; 2-amino-4-methoxy-6-nitrobenzthiazole; 2-amino-6-bromo-4-propoxybenzthiazole; 2-amino-4-cyano-6-nitrobenzthiazole; 2-amino-6-chloro-4-cyanobenzthiazole; 2-amino-6-chloro-4-nitrobenzthiazole; 2-amino-6-bromo-4-cyanobenzthiazole; 2-amino-5-cyano-4-methylbenzthiazole; 2-amino-6-methyl-4-nitrobenzthiazole; 2-amino-6-methoxy-4-nitrobenzthiazole; 2-amino-6-butoxy-4-chlorobenzthiazole; 2-amino-4-chloro-6-methoxybenzthiazole; 2-amino-4-bromo-6-methoxybenzthiazole; 2-amino-4,6-dichlorobenzthiazole; 2-amino-4,6-dibromobenzthiazole; 2-amino-4-methyl-6-(trifluoromethyl)-benzthiazole; 2-amino-4-methyl-6-propionylbenzthiazole; 2-amino-4-chloro-6-(methylsulphonyl)-benzthiazole; 2-amino-6-(methylsulphamoyl)-4-nitrobenzthiazole; 2-amino-4-chloro-6-(cyclohexylsulphonyl)-benzthiazole; 2-amino-4-bromo-6-(ethylsulphonyl)-benzthiazole; 2-amino-N,N-dimethyl-4-nitro-6-benzthiazolesulphonamide; 2-amino-N-benzyl-4-chloro-N-ethyl-6-benzthiazolesulphonamide; 2-amino-4-bromo-N-ethyl-6-benzthiazolesulphoanilide; 2-amino-N,N-dipropyl-4-methyl-6-benzthiazolesulphonamide; 2-amino-4-chloro-6-(methoxycarbonyl)-benzthiazole; 2-amino-4-bromo-6-(butoxycarbonyl)-benzthiazole; 2-amino-6-benzoylbenzthiazole; 2-amino-6-acetylbenzthiazole; 2-amino-N,N-dibutyl-6-benzthiazolesulphonamide; 2-amino-N-ethyl-6-benzthiazolesulphonamide; 2-amino-N-butyl-N-methyl-6-benzthiazolesulphonamide; 2-amino-N-benzyl-N-ethyl-6-benzthiazolesulphonamide; 2-amino-N-benzyl-6-benzthiazolesulphonamide; 2-amino-N-isopropyl-N-methyl-6-benzthiazolesulphonamide; 2-amino-N-isobutyl-6-benzthiazolesulphonamide; 2-amino-N,N-diethyl-6-benzthiazolesulphonamide; 2-amino-N-sec.-butyl-6-benzthiazolesulphonamide; 2-amino-N,N-dimethyl-6-benzthaizolesulphonamide; 2-amino-N,N-dipropyl-6-benzthiazolesulphonamide; 5-nitro-2-aminothiazole; 5-methylsulphonyl-2-aminothiazole; 5-benzoyl-2-aminothiazole; 2-aminoimidazole; 4,5-dicyano-2-aminoimidazole; 4,5-diphenyl-2-aminothiazole; 3-aminopyridine; 2-aminopyridine-N-oxide; 2-aminothiophene; 2-amino-3,4-thiadiazole; 2-amino-3,5-thiadiazole; 2-aminobenzimidazole; 3-amino-1,2,4-triazole; 3-aminobenzisothiazole; 3-amino-5-chlorobenzisothiazole; 3-amino-5-sulphobenzisothiazole; 2-amino-3,4-oxadiazole; 2-amino-3-cyano-tetrahydrobenzthiophene; 3-aminocarbazole; (p-aminophenacyl)-trimethylammonium chloride; 3-amino-7-diethylamino-5-phenylphenazinium chloride; 3,7-diamino-2,8-dimethyl-5-phenylphenazinium chloride; 3-amino-7-diethylamino-2-methyl-5-phenylphenazinium chloride; 2-(p-aminobenzoyl)-ethyl-trimethylammonium chloride; 3-(p-aminobenzoyl)-propyl-triethylammonium bromide; (4-amino-3-bromophenacyl)-trimethylammonium chloride; (4-amino-2,5-dimethylphenacyl)-trimethylammonium chloride; (4-amino-2-chlorophenacyl)-trimethylammonium chloride; (4-amino-3,5-dibromophenacyl)-trimethylammonium; 2-(p-aminostyryl)-1-methylpyridinium methosulphate; 2-(p-aminostyryl)-5-ethyl-1-methylpyridinium methosulphate; (p-aminophenacyl)-dimethyl-(2-hydroxyethyl)-ammonium chloride, sulphate and phosphate; (3'-amino-4-methylphenacyl)-trimethylammonium chloride; (4'-amino-3'-chlorophenacyl)-dimethylbenzylammonium sulphate; 4'-amino-2',5'-dimethylphenacyl-dimethyl-(2-hydroxyethyl)-ammonium phosphate; (3-amino-4-methoxyphenacyl)-trimethylammonium chloride; (p-amino-alpha-methyl-phenacyl)-trimethylammonium chloride; anthranilic acid; 4-chloroanthranilic acid; p-aminobenzoic acid; m-aminobenzoic acid; 4-aminosalicylic acid; orthanilic acid; metanilic acid; sulphanilic acid; 4-chloro-metanilic acid; 6-chloro-metanilic acid; p-aminobenzoic acid methyl ester; 2-amino-5-chlorobenzenesulphonic acid; 2,5-dichlorosulphanilic acid; 2-amino-5-nitrobenzenesulphonic acid; 3-chloroaniline-5-sulphonic acid; 3-amino-5-chloro-o-toluenesulphonic acid; 2-aminotoluene-5-sulphonic acid; 2-amino-6-chlorotoluene-3-sulphonic acid; 3-amino-6-chlorotoluene-2-sulphonic acid; 2-chloro-5-aminotoluene-4-sulphonic acid; 3-aminotoluene-6-sulphonic acid; 3-aminotoluene-3-sulphonic acid; m-xylidine-sulphonic acid; 4,6-diamino-m-toluenesulphonic acid; 4-acetylaminoaniline-2-sulphonic acid; 2-(p-aminoaniline)-5-nitrobenzenesulphonic acid; 6-(p-toluidino)-metanilic acid; 5-amino-2-(p-methoxyanilino)-benzenesulphonic acid; 5-amino-1-naphthalenesulphonic acid; 5-amino-2-naphthalenesulphonic acid; 8-amino-2-naphthalenesulphonic acid; 8-amino-1-naphthalenesulphonic acid; 5-acetamido-8-amino-2-naphthalenesulphonic acid; 8-acetamido-5-amino-2-naphthalenesulphonic acid; 6-amino-2-naphthalenesulphonic acid; aniline-2,5-disulphonic acid; 8-amino-1,6-naphthalenedisulphonic acid; 7-amino-1,3-naphthalenedisulphonic acid; 6-amino-1,3-naphthalenedisulphonic acid; 4,4'-diamino-2,2'-stilbenedisulphonic acid; 4,4'-diaminodiphenyl-2,2'-disulphonic acid; 3,3'-dimethyl-4,4'-diaminodiphenyl-6,6'-disulphonic acid; 4-methoxymetanilic acid; 4-methoxy-6-nitrometanilic acid; 2-ethoxy-1-naphthylamine-6-sulphonic acid; 6-(p-aminobenzamido)-1-naphthol-3-sulphonic acid and p-(p-aminophenylazo)-benzenesulphonic acid.

Typical examples of coupling components which may be mentioned are phenols, such as phenol in itself and o-, m- or p-cresol, resorcinol, 4-phenylazo-1,3-dihydroxybenzene and 3-acetylaminophenol; naphthols, such as 1- or 2-naphthol, 6-bromo-2-naphthol, 4-methoxy-1-naphthol and 2-naphthol-6-sulphonamide; acylacetoarylamides, such as acetoacetanilide, acetoacet-2-chloroanilide and acetoacet-2-, -3- or -4-(methyl or methoxy)-anilide; 5-aminopyrazoles, such as 1-phenyl-3-methyl-5-aminopyrazole; 2,6-dihydroxypyridines, such as 3-cyano-4-methyl-2,6-dihydroxypyridine, 1-ethyl-3-cyano-4-methyl-6-hydroxypyrid-2-one and 3-cyano-6-hydroxy-1-(3'-methoxypropyl)-4-methylpyrid-2-one; 5-pyrazolones, such as 1,3-dimethyl-5-pyrazolone, 1-phenyl-3-(carboalkoxy, carboxamido or methyl)-5-pyrazolone and 1[2'-, -3'- or -4'-(nitro-, amino-, chloro-, bromo-, methyl- or methoxy)-phenyl]-3-methyl-5-pyrazolone; primary, secondary or tertiary amines of the aromatic series, such as 1-naphthylamine and N-(β-hydroxyethyl)-1-naphthylamine, and especially amines of the formula

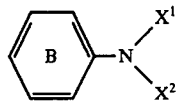

wherein the benzene ring B can contain further substituents and $X^1$ and $X^2$ each independently of one another denote hydrogen or optionally substituted lower alkyl radicals.

The following may be mentioned as typical examples of such coupling components: N,N-dimethylaniline, N,N-di-(β-carbomethoxyethyl)-m-toluidine, N-(γ-methoxypropyl)-3-acetylaminoaniline, N,N-di-(β-hydroxyethyl)-2,5-dimethoxyaniline, diphenylamine, N-ethyl-N-(β-cyanoethyl)-aniline, N-ethyl-N-(β-hydroxyethyl)-aniline, N,N-di-(β-hydroxyethyl)-aniline, N,N-di-(β-acetoxyethyl)-m-toluidine and 2-methoxy-5-acetylamino-N-[β-(β'-methoxyethoxycarbonyl)-ethyl]-aniline.

The coupling component can optionally also be a coupling component which contains water-soluble groups, such as the sulphonic acid group or carboxylic acid group.

The following may be mentioned as selected examples of coupling components which contain carboxylic acid groups or their derivatives: phenols, such as 4-hydroxybenzoic acid and 4-hydroxyphenylacetic acid; naphthols, such as 4-carboxy-1-naphthol; acetoacetarylamides, such as acetoacet-4-carboxyanilide; 2,6-dihydroxypyridines, such as 4-carboxy-2,6-dihydroxypyridine; 5-pyrazolones, such as 1-phenyl-3-carboxy-5-pyrazolone, 1-[2'-, 3'- or 4'-(nitro-, amino-, chloro-, bromo-, methyl- or methoxy-)phenyl]-3-carboxy-5-pyrazolone and 1-∴-carboxyethyl-3-methyl-5-pyrazolone; and amines of the aromatic series, such as N-β-carboxyethyl-1-naphthylamine, 3-carboxy-2-naphthylamine, N-(δ-carboxyvaleroyloxy-ethyl)-1-naphthylamine, N-ethyl-N-β-carboxyethylaniline, 3-(N,N-diethylamino)-β-carboxypropionanilide, 2-methoxy-5-acetylamino-N-β-carboxyethylaniline, N-β-cyanoethyl-m-toluidine, N-β-methoxycarbonylethyl-N-β-carboxyethylaniline, N-ethyl-N-δ-carboxyvaleroyloxy)-ethylaniline, N-β-carboxyethylcresidine, N-βcyanoethyl-N-β-(β-carboxypropionyloxy)-ethyl-m-toluidine, 3-N,N-(diethylamino)-oxanilide, N-ethyl-N-β-(β-carboxyethoxy)-ethylaniline, N-β-carboxyethyl-N-β-acetoxyethylaniline, N-β-carboxyethyl-N-β-methoxyethyl-m-toluidine, β-cyanoethyl-N-β-[β-carboxy-propionyloxyethoxy]-ethyl-m-toluidine, N-ethyl-N-[γ-(carboxymethylthio)-β-hydroxypropyl]-m-toluidine, N-ethyl-N-β-(carboxymethylthioacetoxy)-ethylaniline, N-β-(β-carboxypropionyloxy)-ethyl-o-anisidine, N-ethyl-N-β-(carboxymethylthio)-ethylaniline and N-ethyl-N-γ-carboxy-β-hydroxypropyl-m-toluidine, indoles, such as 2-methylindole and 2-phenylindole, 3-hydroxy-2-naphthoic acid arylamides, such as 3-hydroxy-2-naphthoic acid anilide, 3-hydroxy-2-naphthoic acid 2-methoxyanilide, 3-hydroxy-2-naphthoic acid 2,5-dimethoxy-4-chloroanilide and corresponding 3-hydroxy-2-anthroic acid arylamides, 2-hydroxy-3-carbazole-carboxylic acid arylamides and 3-hydroxydibenzofuranecarboxylic acid arylamides.

The surface-active agent can appropriately be used in amounts of 5–400% by weight and preferably of 50–200% by weight of the theoretical amount by weight of the dyestuff formed.

EXAMPLE 1

17.2 g of 2-chloro-4-nitroaniline are comminuted in a corundum disc mill together with 160 g of a 50% strength aqueous solution of a reaction product of 1 mol of ditolyl ether, 1.7 mols of sulphuric acid and 0.7 mol of formaldehyde, and with 1 g of an adduct of oleyl alcohol and ethylene oxide, with addition of 50 g of water. 50 g of ice are added thereto. The mixture is stirred for a further half an hour, whilst cooling. 24 ml of a 30% strength aqueous sodium nitrite solution are run into this suspension over the course of about 15 minutes. The diazotisation mixture is stirred for a further 2 hours, whilst cooling. Excess sodium nitrite is then destroyed with amidosulphonic acid at 0°–5° C.

23.4 g of N-β-cyanoethyl-N-β-carbomethoxyaminobenzene are added to the resulting diazotisation suspension over the course of 5 minutes. The mixture is stirred for a further 2 hours at 0°–5° C. and then for 1 hour at room temperature. The suspension is then neutralised with sodium hydroxide solution (20% strength) and subjected to a mechanical grinding treatment in order to reduce the particle size to less than 3µ. After spray drying, a product which is easily dispersible in water is obtained.

EXAMPLE 2

15 g of p-aminobenzoic acid methyl ester are comminuted in a corundum disc mill together with 135 g of a 50% strength aqueous solution of a reaction product of 1 mol of diphenyl, 1.7 mols of sulphuric acid and 0.7 mol of formaldehyde and with 1 g of an adduct of oleyl alcohol and ethylene oxide, with addition of 100 g of water, and the mixture is then briefly stirred with 50 g of ice. 24 ml of a 30% strength aqueous sodium nitrite solution are added in the course of about 5 minutes. The mixture is stirred for a further hour whilst cooling and excess sodium nitrite is destroyed with amidosulphonic acid.

17.4 g of 1-phenyl-3-methyl-5-pyrazolone are dissolved in 60 g of water and 30 g of 40% strength sodium hydroxide solution. The solution of the diazotised amine is added to this solution in the course of about 10 minutes. The pH value drops to about 9. The mixture is stirred for a further hour at 0°–5° C. The resulting dyestuff suspension is then subjected to a mechanical grinding treatment, without being isolated, and is spray dried.

EXAMPLE 3

17.2 g of 2-chloro-4-nitroaniline are comminuted in a corundum disc mill together with 100 g of a 50% strength aqueous solution of a reaction product of 1 mol of naphthalene, 1.43 mols of sulphuric acid and 0.65 mol of formaldehyde, 150 g of water and 1 g of an adduct of oleyl alcohol and ethylene oxide. 50 g of ice are added to the resulting suspension, the mixture is stirred for 30 minutes and 24 ml of an aqueous 30% strength sodium nitrite solution are added in the course of about 15 minutes. The mixture is then stirred for a further 2 hours, whilst cooling. Excess sodium nitrite is destroyed with amidosulphonic acid.

In the course of 15 minutes, a solution of 21.6 g of 1-(sulpholan-3-yl)-3-methyl-5-pyrazolone, 29 ml of 40% strength sodium hydroxide solution and 50 g of water is added to this suspension in the course of 30 minutes at 0°–5° C. The pH value rises to about 7. The mixture is stirred for about 2 hours longer and the resulting dyestuff suspension is subjected to a mechanical grinding treatment. The dyestuff suspension is then spray dried, without isolation.

EXAMPLE 4

14.0 g of 4-nitroaniline, 17.4 g of N-ethyl-N-($\beta$-cyanoethyl)-aminobenzene, 200 g of water, 23.8 ml of a 30% strength aqueous sodium nitrite solution and 30 g of a reaction product of 1 mol of ditolyl ether, 1.7 mols of sulphuric acid and 0.7 mol of formaldehyde, as the Na salt, are first preground in a corundum disc mill and then finely ground for 10 minutes in a stirred ball mill. 20 g of a condensation product of 1 mol of ditolyl ether, 1.7 mols of sulphuric acid and 0.7 mol of formaldehyde are then added over the course of 10 minutes, whilst grinding. The mixture is then ground for a further 10 minutes and at the same time neutralised with 40% strength sodium hydroxide solution. The resulting dyestuff suspension is spray dried without further isolation.

EXAMPLE 5

19.6 g of 2,4,5-trichloroaniline, 19.3 g of 2-phenylindole, 23.8 ml of a 30% strength aqueous sodium nitrite solution, 30 g of a reaction product of 1 mol of ditolyl ether, 1.7 mols of sulphuric acid and 0.7 mol of formaldehyde, as the Na salt, and 200 g of water are first pre-ground by means of a corundum disc mill, and then finely ground for 10 minutes in a stirred ball mill. 50 g of a condensation product of 1 mol of ditolyl ether and 1.7 mols of formaldehyde (in the acid form) are then added over the course of 10 minutes, whilst grinding. Grinding is then continued for 10 minutes and at the same time the mixture is neutralised with 40% strength sodium hydroxide solution. The resulting dyestuff suspension is spray dried without further isolation.

EXAMPLE 6

17.2 g of 2-chloro-4-nitroaniline are finely ground with 100 g of water and 24 ml of a 30% strength aqueous sodium nitrite solution, using a corundum disc mill, and a solution of 17.4 g of N-ethyl-N-($\beta$-cyanoethyl)-aminobenzene in 30 g of a 50% strength aqueous solution of a reaction product of 1 mol of naphthalene, 1.43 mols of sulphuric acid and 0.65 mol of formaldehyde are then added dropwise over the course of 1 hour at 5° C. The mixture is then stirred for a further hour and excess sodium nitrite is destroyed with amidosulphonic acid. The dyestuff suspension is then neutralised with 40% strength sodium hydroxide solution, adjusted to the desired tinctorial strength with further dispersing agent and then ground by means of a stirred ball mill until the particle size is less than 3$\mu$.

On spray drying this dyestuff suspension, a product which is readily dispersible in water is obtained.

EXAMPLE 7

15.1 g of p-aminobenzoic acid methyl ester and 17.5 g of 1-phenyl-3-methylpyrazol-5-one are comminuted together with 20 g of a reaction product of 1 mol of diphenyl, 1.7 mols of sulphuric acid and 0.7 of formaldehyde, as the Na salt, as well as 50 g of a reaction product of 1 mol of naphthalene, 1.43 mols of sulphuric acid and 0.65 mol of formaldehyde, in the presence of 200 ml of water, to a particle size of at least 150 $\mu$m.

23.5 ml of a 30% strength sodium nitrite solution are added to the resulting suspension in a stirred ball mill over the course of 10 minutes at room temperature. Over the course of a further 10 minutes, the suspension is neutralised, in the stirred ball mill, with 40% strength sodium hydroxide solution. The resulting dyestuff suspension is adjusted to the desired tinctorial strength with further standardising agent and is then spray dried, without isolation.

EXAMPLE 8

14.0 g of 4-nitroaniline, 17.4 g of N-ethyl-N-($\beta$-cyanoethyl)-aminobenzene, 150 ml of water and 150 g of a reaction product of 1 mol of ditolyl ether, 1.7 mols of sulphuric acid and 0.7 mol of formaldehyde are heated to a temperature of about 80° C., whilst stirring, until either a fine suspension or a solution has formed.

23.5 ml of a 30% strength aqueous sodium nitrite solution are added to this solution or suspension over the course of 30 minutes at about 80° C. The mixture is then carefully neutralised with 40% strength sodium hydroxide solution. The dyestuff suspension is allowed to cool to room temperature and is then subjected to a mechanical after-treatment and is spray dried without isolation.

EXAMPLE 9

17.2 g of 4-chloro-2-nitroaniline are comminuted in a corundum disc mill together with 160 g of a 50% strength aqueous solution of a reaction product of 1 mol of ditolyl ether, 1.7 mols of sulphuric acid and 0.7 mol of formaldehyde and with 1 g of an adduct of oleyl alcohol and ethylene oxide, with addition of 50 g of water. 50 g of ice are added thereto. The mixture is stirred for a further half an hour, whilst cooling. 24 ml of a 30% strength aqueous sodium nitrite solution are run into this suspension over the course of about 15 minutes at 0°–5° C. The mixture is stirred for a further 2 hours, whilst cooling. Excess sodium nitrite is then destroyed with amidosulphonic acid.

21.3 g of acetoacetic acid 2-chloroanilide are comminuted in a corundum disc mill together with 10 g of a reaction product of ditolyl ether, sulphuric acid and formaldehyde, as the Na salt, and 100 ml of water. This suspension is added dropwise over the course of 30 minutes, at 0°–5° C., to the solution of the diazotised amine. The mixture is stirred for a further hour at 0°–5° C., the pH is raised to 5 with 40% strength sodium hydroxide solution, and the mixture is stirred for a further hour at room temperature. The suspension is then completely neutralised with sodium hydroxide solution and is subjected to a mechanical grinding treatment in order to reduce the particle size to <3 $\mu$m.

EXAMPLE 10

24.2 g of 2,5-dichloroaminobenzene-4-sulphonic acid are precomminuted in 125 g of water and 100 g of a reaction product of 1 mol of diphenyl, 1.7 mols of sulphuric acid and 0.7 mol of formaldehyde, and 1 g of an adduct of oleyl alcohol and ethylene oxide, and the mixture is introduced into a stirred ball mill. 24 ml of a 30% strength sodium nitrite solution are directly run into the above mixture over the course of 2 minutes at room temperature. After 10 minutes, the diazotisation has ended and excess sodium nitrite is destroyed with amidosulphonic acid.

17.3 g of 1-phenyl-3-methyl-5-iminopyrazole, together with 100 ml of water and 10 g of a reaction product of 1 mol of diphenyl, 1.7 mols of sulphuric acid and 0.7 mol of formaldehyde are converted to a suspension in a stirred ball mill. The solution of the diazotised amine is run into this suspension over the course of about 3 minutes, whilst grinding. During the addition, the pH of 6 is maintained by adding dilute sodium hydroxide solution. The coupling has ended within 10 minutes. The dyestuff obtained by spray drying is readily redispersible. Before spraying drying, the dyestuff dispersion can be purified by ultrafiltration, in which case membranes having a molecular separation limit of 200 are employed.

EXAMPLE 11

26.5 g of 6-bromo-2,4-dinitroaniline and 50 g of a mixture of 1 part of acetic acid and 6 parts of a condensation product of 1 mol of diphenyl, 1.7 mols of sulphuric acid and 0.7 mol of formaldehyde are precomminuted in a corundum disc mill and the mixture is then cooled to a temperature of 0°–5° C.

17 ml of 46% strength nitrosylsulphuric acid are added to this suspension over the course of 30 minutes whilst stirring and cooling efficiently, and the mixture is then stirred for a further 15 minutes.

67 g of 2-N,N-di-(β-carbomethoxy-oxethyl)-amino-4-acetylamino-1-methoxybenzene and 20 g of a condensation product of 1 mol of ditolyl ether, 1.7 mols of sulphuric and 0.7 mol of formaldehyde are thoroughly stirred with 120 ml of water and cooled to about −5° C. The amine diazotised in accordance with paragraphs one and two is added to this solution over the course of 30 minutes. The mixture is stirred for a further hour and the pH is brought to 5 with 40% strength sodium hydroxide solution. The resulting suspension is subjected to a mechanical grinding treatment and is spray dried.

EXAMPLE 12

7.1 g of very finely powdered sodium nitrite are slowly introduced into 80 g of a mixture of 6 parts of dispersing agent acid and 1 part of glacial acetic acid, whilst cooling thoroughly in an ice bath. The dispersing agent acid is a condensation product of 1 mol of terphenyl, 1.7 mols of sulphuric acid and 0.7 mol of formaldehyde. 16.3 g of ground 2-cyano-4-nitroaniline are then introduced slowly at about 10° C. The mixture is then carefully diluted with 100 ml of ice water. 26.5 g of diacetoxyethylaniline are added and the mixture is stirred for about 3 hours. After completion of coupling, the mixture is neutralised with 20% strength sodium hydroxide solution and the dyestuff suspension is then comminuted in a bead mill to a particle size of less than 3 μm. The suspension is adjusted to the desired tinctorial strength with further dispersing agent, and is spray dried.

We claim:

1. In the process of preparing an azo dyestuff by diazotizing an amine and thereafter coupling the diazo component formed with a coupling component, the improvement comprising preparing a low salt or salt free azo dye composition without a step of salt separation by carrying out the diazotization in the presence of a free dispersing agent acid which comprises the reaction product of formaldehyde and an aromatic sulphonic acid, and then conducting the coupling reaction after adding no base or by adding only an amount of base which would give the resulting composition of a pH of no more than 3.

2. Process according to claim 1, in which the dispersing agent acid is free from salt.

3. Process according to claim 1, in which dispersing agent acid is used as the sole acid in the diazotisation.

4. Process according to claim 1 in which the free dispersing agent acid is the reaction product of naphthalenesulphonic acid and formaldehyde, the reaction product of ditolyl-ethersulphonic acid and formaldehyde, the reaction product of diphenylsulphonic acid and formaldehyde or the reaction product of terphenylsulphonic acid and formaldehyde.

5. Process according to claim 1 in which further surface-active agents are added.

* * * * *